US010503919B2

(12) United States Patent
Effendi et al.

(10) Patent No.: US 10,503,919 B2
(45) Date of Patent: Dec. 10, 2019

(54) ELECTRONIC SIGNATURE FRAMEWORK WITH KEYSTROKE BIOMETRIC AUTHENTICATION

(71) Applicant: Adobe Inc., San Jose, CA (US)

(72) Inventors: Santo Effendi, San Jose, CA (US); Paul C. Anderson, Lakeside, CA (US); Sarika Phatak, San Jose, CA (US); Mangesh Bhandarkar, Los Altos, CA (US)

(73) Assignee: Adobe Inc., San Jose, CA (US)

( * ) Notice: Subject to any disclaimer, the term of this patent is extended or adjusted under 35 U.S.C. 154(b) by 324 days.

(21) Appl. No.: 15/483,675

(22) Filed: Apr. 10, 2017

(65) Prior Publication Data

US 2018/0293393 A1   Oct. 11, 2018

(51) Int. Cl.
G06F 21/62 (2013.01)
G06F 21/32 (2013.01)

(52) U.S. Cl.
CPC .......... *G06F 21/6209* (2013.01); *G06F 21/32* (2013.01); *G06F 2221/2129* (2013.01)

(58) Field of Classification Search
CPC ................. G06F 21/6209; G06F 21/32; G06F 2221/2129
See application file for complete search history.

(56) References Cited

U.S. PATENT DOCUMENTS 4,621,334 A 11/1986 Garcia
4,805,222 A 2/1989 Young 5,825,880 A 10/1998 Sudia
5,910,987 A 6/1999 Ginter
6,073,101 A 6/2000 Maes
(Continued)

FOREIGN PATENT DOCUMENTS

WO     0148986 A1    7/2001

OTHER PUBLICATIONS

Notice of Allowance received in U.S. Appl. No. 15/363,433 (6 pages) (dated Nov. 6, 2018).

(Continued)

*Primary Examiner* — Lynn D Feild
*Assistant Examiner* — Jessica J South
(74) *Attorney, Agent, or Firm* — Finch & Maloney PLLC

(57) ABSTRACT

An intended signatory receives an electronic signature request that includes instructions for accessing both an unsigned document and server functionality that enables the intended signatory to electronically sign the document. To gain such access, the intended signatory must pass username and password authentication, which serves as a first authentication factor. After the intended signatory is authenticated, he/she can access the unsigned document. However, once the intended signatory is initially authenticated, it can be assumed that his/her work session is subject to being misappropriated by an unauthorized user. Thus, when a command to apply an electronic signature to the document is invoked, the would-be signatory must pass keystroke biometrics authentication, which serves as a second authentication factor. This second authentication is temporally separated from the first username/password authentication, but it occurs at substantially the same time that the electronic signature is to be applied to the document.

20 Claims, 6 Drawing Sheets

(56) References Cited

U.S. PATENT DOCUMENTS

| | | |
|---|---|---|
| 6,091,835 A | 7/2000 | Smithies |
| 6,157,935 A | 12/2000 | Tran |
| 6,240,091 B1 | 5/2001 | Ginzboorg |
| 6,615,234 B1 | 9/2003 | Adamske |
| 6,691,089 B1 | 2/2004 | Su |
| 6,928,421 B2 | 8/2005 | Craig |
| 6,959,382 B1 | 10/2005 | Kinnis |
| 7,206,938 B2 | 4/2007 | Bender |
| 7,562,053 B2 | 7/2009 | Twining |
| 7,581,109 B2 | 8/2009 | De Boursetty |
| 7,694,143 B2 | 4/2010 | Karimisetty |
| 7,779,355 B1 | 8/2010 | Erol |
| 7,895,166 B2 | 2/2011 | Foygel |
| 7,996,367 B2 | 8/2011 | Foygel |
| 7,996,439 B2 | 8/2011 | Foygel |
| 8,126,868 B1 | 2/2012 | Vincent |
| 8,230,232 B2 | 7/2012 | Ahmed |
| 8,234,494 B1 | 7/2012 | Bansal |
| 8,316,237 B1 | 11/2012 | Felsher et al. |
| 8,332,253 B1 | 12/2012 | Farmer |
| 8,443,443 B2 | 5/2013 | Nordstrom |
| 8,844,055 B2 | 9/2014 | Follis |
| 8,918,311 B1 | 12/2014 | Johnson |
| 8,930,308 B1 | 1/2015 | Johnson |
| 9,058,515 B1 | 6/2015 | Amtrup |
| 9,059,858 B1 | 6/2015 | Giardina et al. |
| 9,292,876 B1 | 3/2016 | Shimkus |
| 9,430,626 B1* | 8/2016 | Rome .................. G06F 21/316 |
| 9,432,368 B1 | 8/2016 | Saxena |
| 9,531,545 B2 | 12/2016 | Follis |
| 9,544,149 B2 | 1/2017 | Follis |
| 9,626,653 B2 | 4/2017 | Saxena |
| 9,741,085 B2 | 8/2017 | Avni et al. |
| 9,807,073 B1* | 10/2017 | Miller .................. H04L 63/08 |
| 2001/0002485 A1 | 5/2001 | Brisbee |
| 2002/0038290 A1 | 3/2002 | Cochran |
| 2002/0062322 A1 | 5/2002 | Genghini |
| 2002/0091651 A1 | 7/2002 | Petrogiannis |
| 2002/0095290 A1 | 7/2002 | Kahn |
| 2002/0103656 A1 | 8/2002 | Bahler |
| 2002/0150241 A1 | 10/2002 | Scheidt et al. |
| 2003/0009513 A1 | 1/2003 | Ludwig |
| 2003/0037004 A1 | 2/2003 | Buffum |
| 2003/0074216 A1 | 4/2003 | Salle |
| 2003/0083906 A1 | 5/2003 | Howell |
| 2003/0125054 A1 | 7/2003 | Garcia |
| 2003/0130953 A1 | 7/2003 | Narasimhan et al. |
| 2003/0154083 A1 | 8/2003 | Kobylevsky |
| 2003/0177361 A1 | 9/2003 | Wheeler |
| 2003/0187671 A1 | 10/2003 | Kumhyr |
| 2003/0217275 A1 | 11/2003 | Bentley |
| 2004/0024688 A1 | 2/2004 | Bi et al. |
| 2004/0088587 A1 | 5/2004 | Ramaswamy et al. |
| 2004/0102959 A1 | 5/2004 | Estrin |
| 2004/0139344 A1 | 7/2004 | Maurer |
| 2004/0167847 A1 | 8/2004 | Nathan |
| 2004/0187037 A1 | 9/2004 | Checco |
| 2004/0204939 A1 | 10/2004 | Liu |
| 2004/0225887 A1 | 11/2004 | O'Neil |
| 2004/0243811 A1 | 12/2004 | Frisch |
| 2004/0264652 A1 | 12/2004 | Erhart |
| 2005/0132196 A1 | 6/2005 | Dietl |
| 2005/0228665 A1 | 10/2005 | Kobayashi |
| 2005/0228999 A1 | 10/2005 | Jerdonek |
| 2005/0289345 A1 | 12/2005 | Haas |
| 2006/0020460 A1 | 1/2006 | Itou |
| 2006/0041828 A1 | 2/2006 | King |
| 2006/0110011 A1 | 5/2006 | Cohen |
| 2006/0122880 A1 | 6/2006 | Franco |
| 2006/0143462 A1 | 6/2006 | Jacobs |
| 2006/0157559 A1 | 7/2006 | Levy |
| 2006/0182245 A1 | 8/2006 | Steinmetz |
| 2006/0212813 A1 | 9/2006 | Yalovsky |
| 2006/0253324 A1 | 11/2006 | Miller |
| 2006/0280339 A1 | 12/2006 | Cho |
| 2007/0055517 A1 | 3/2007 | Spector |
| 2007/0113164 A1 | 5/2007 | Hansen |
| 2007/0124507 A1 | 5/2007 | Gurram |
| 2007/0143398 A1 | 6/2007 | Graham |
| 2007/0220614 A1 | 9/2007 | Ellis |
| 2007/0226511 A1 | 9/2007 | Wei |
| 2008/0015883 A1 | 1/2008 | Hermann |
| 2008/0177550 A1 | 7/2008 | Mumm |
| 2008/0180213 A1 | 7/2008 | Flax |
| 2008/0195389 A1 | 8/2008 | Zhang |
| 2008/0209229 A1 | 8/2008 | Ramakrishnan |
| 2009/0025087 A1 | 1/2009 | Peirson |
| 2009/0062944 A1 | 3/2009 | Wood |
| 2009/0079546 A1 | 3/2009 | Beenau et al. |
| 2009/0112767 A1 | 4/2009 | Hammad |
| 2009/0116703 A1 | 5/2009 | Schultz |
| 2009/0117879 A1 | 5/2009 | Pawar |
| 2009/0177300 A1 | 7/2009 | Lee |
| 2009/0222269 A1 | 9/2009 | Mori |
| 2009/0228584 A1 | 9/2009 | Maes |
| 2009/0254345 A1 | 10/2009 | Fleizach |
| 2009/0254572 A1 | 10/2009 | Redlich et al. |
| 2009/0260060 A1 | 10/2009 | Smith |
| 2009/0307744 A1 | 12/2009 | Nanda |
| 2009/0327735 A1 | 12/2009 | Feng |
| 2010/0131533 A1 | 5/2010 | Ortiz |
| 2010/0161993 A1 | 6/2010 | Mayer |
| 2010/0235285 A1 | 9/2010 | Hoffberg |
| 2010/0281254 A1 | 11/2010 | Carro |
| 2010/0306670 A1 | 12/2010 | Quinn |
| 2011/0022940 A1 | 1/2011 | King |
| 2011/0047385 A1 | 2/2011 | Kleinberg |
| 2011/0093777 A1* | 4/2011 | Dunn .................. G06F 17/243 715/268 |
| 2011/0212717 A1 | 9/2011 | Rhoads |
| 2011/0225485 A1 | 9/2011 | Schnitt |
| 2012/0072837 A1 | 3/2012 | Triola |
| 2012/0190405 A1 | 7/2012 | Kumaran |
| 2012/0192250 A1 | 7/2012 | Rakan |
| 2012/0254332 A1 | 10/2012 | Irvin |
| 2013/0006642 A1 | 1/2013 | Saxena et al. |
| 2013/0046645 A1 | 2/2013 | Grigg |
| 2013/0089300 A1 | 4/2013 | Soundararajan |
| 2013/0103723 A1 | 4/2013 | Hori |
| 2013/0132091 A1 | 5/2013 | Skerpac |
| 2013/0138438 A1 | 5/2013 | Bachtiger |
| 2013/0166915 A1 | 6/2013 | Desai |
| 2013/0166916 A1 | 6/2013 | Wu et al. |
| 2013/0179171 A1 | 7/2013 | Howes |
| 2013/0182002 A1 | 7/2013 | Macciola |
| 2013/0191287 A1 | 7/2013 | Gainer |
| 2013/0263283 A1 | 10/2013 | Peterson |
| 2013/0269013 A1 | 10/2013 | Parry |
| 2013/0283189 A1 | 10/2013 | Basso |
| 2013/0326225 A1 | 12/2013 | Murao |
| 2013/0339358 A1 | 12/2013 | Huibers |
| 2013/0346356 A1 | 12/2013 | Welinder et al. |
| 2014/0007001 A1 | 1/2014 | Li et al. |
| 2014/0007002 A1 | 1/2014 | Chang et al. |
| 2014/0019761 A1 | 1/2014 | Shapiro |
| 2014/0019843 A1 | 1/2014 | Schmidt |
| 2014/0078544 A1 | 3/2014 | Motoyama |
| 2014/0079297 A1 | 3/2014 | Tadayon |
| 2014/0108010 A1 | 4/2014 | Maltseff et al. |
| 2014/0168716 A1 | 6/2014 | King et al. |
| 2014/0236978 A1 | 8/2014 | King |
| 2014/0244451 A1 | 8/2014 | Mayer |
| 2014/0279324 A1 | 9/2014 | King |
| 2014/0282243 A1 | 9/2014 | Eye |
| 2014/0294302 A1 | 10/2014 | King |
| 2014/0343943 A1 | 11/2014 | Al-Telmissani |
| 2014/0365281 A1 | 12/2014 | Onischuk |
| 2014/0372115 A1 | 12/2014 | LeBeau |
| 2015/0012417 A1 | 1/2015 | Joao |
| 2015/0016661 A1 | 1/2015 | Lord |
| 2015/0063714 A1 | 3/2015 | King |
| 2015/0073823 A1 | 3/2015 | Ladd |
| 2015/0100578 A1 | 4/2015 | Rosen |
| 2015/0127348 A1 | 5/2015 | Follis |

(56) References Cited

U.S. PATENT DOCUMENTS

| | | | |
|---|---|---|---|
| 2015/0128217 A1* | 5/2015 | Yasaki | G06F 21/31 726/3 |
| 2015/0186634 A1 | 7/2015 | Crandell et al. | |
| 2015/0213404 A1 | 7/2015 | Follis | |
| 2015/0245111 A1 | 8/2015 | Berry et al. | |
| 2015/0294094 A1 | 10/2015 | Hefeeda | |
| 2016/0078869 A1 | 3/2016 | Syrdal | |
| 2016/0087800 A1 | 3/2016 | Weissinger | |
| 2016/0132693 A1 | 5/2016 | Kumar | |
| 2016/0191251 A1 | 6/2016 | Alkhalaf | |
| 2016/0306816 A1 | 10/2016 | Morales, Jr. | |
| 2017/0046560 A1 | 2/2017 | Tsur | |
| 2017/0063553 A1 | 3/2017 | Saxena | |
| 2018/0137354 A1* | 5/2018 | Nowak | G06F 3/013 |

OTHER PUBLICATIONS

Notice of Allowance received in U.S. Appl. No. 14/534,583 (8 pages) (dated May 2, 2017).

Notice of Allowance received in U.S. Appl. No. 15/707,538 (15 pages) (dated Apr. 9, 2019).

Notice of Allowance received in U.S. Appl. No. 14/840,380 (11 pages) (dated Aug. 23, 2017).

Notice of Allowance received in U.S. Appl. No. 14/069,674 (8 pages) (dated Jan. 24, 2018).

Araújo et al., "User Authentication Through Typing Biometrics Features", IEEE Transactions on Signal Processing, vol. 53, No. 2, pp. 851-855 (2005).

Deng et al., "Keystroke Dynamics User Authentication Based on Gaussian Mixture Model and Deep Belief Nets", ISRN Signal Processing, vol. 2013, Article ID 565183, 7 pages (2013).

Moskovitch et al., "Identity Theft, Computers and Behavioral Biometrics", Proceedings of the 2009 IEEE International Conference on Intelligence and Security Informatics, pp. 155-160 (2009).

"TypingDNA Authentication API", version 2.1.0 (Feb. 12, 2016), retreived from <http://api.typingdna.com/index.html>.

Simske, Steven J. Dynamic Biometrics: The Case for a Real-Time Solution to the Problem of Access Control, Privacy and Security. 2009 First IEEE International Conference on Biometrics, Identiy and Security. Pub. Date: 2009. http://ieeexplore.ieee.org/stamp/stamp.jsp?tp=&anumber=5507535.

Maeder, Anthony; Fookes, Clinton; Sridharan, Sridha. Gaze Based User Authentication for Personal Computer Applications. Proceedings of 2004 International Symposium on Intelligent Multimedia, Video and Speech Processing. Pub. Date: 2004. http://ieeexplore.ieee.org/stamp/stamp.jsp?tp=&arnumber=1434167.

Craig Le Clair, "What to Look for in E-Signature Providers" (Nov. 15, 2011). Available at https://www.echosign.adobe.com/content/dam/echosignidocs/pdfs/Forrester_What_To_Look_For_In_E-Signature_Providers_Nov_2011.pdf.

EchoSign Jan. 2015 Release, retrieved from <https://www.echosign.adobe.com/content/dam/echosign/docs/pdfs/AdobeES_JanuaryRelease_WhatsNew.pdf> on Aug. 24, 2015.

U.S. Appl. No. 15/166,979, filed May 27, 2016, 40 pages.

Notice of Allowance received in U.S. Appl. No. 15/166,979 (7 pages) (dated May 2, 2019).

\* cited by examiner

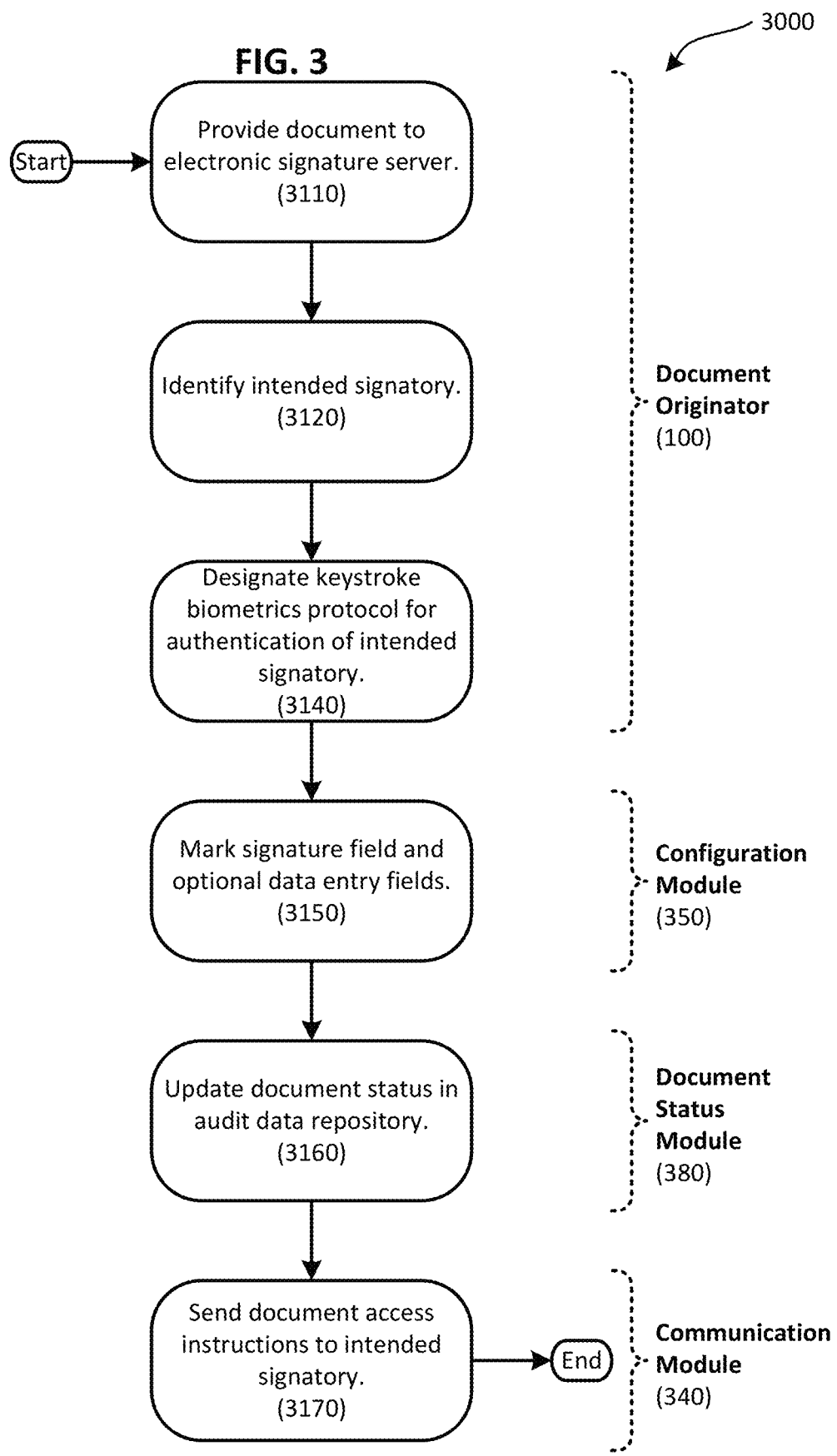

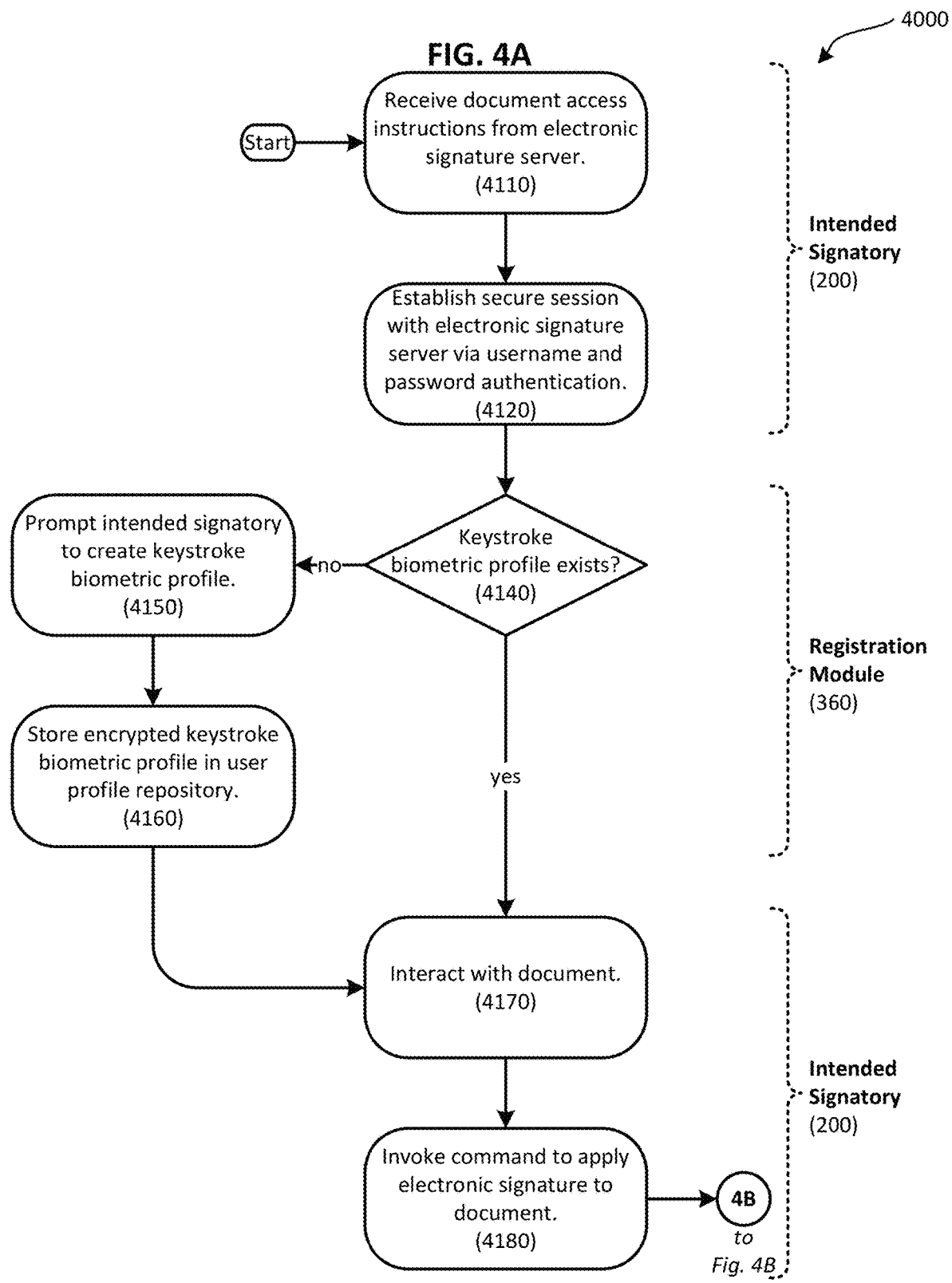

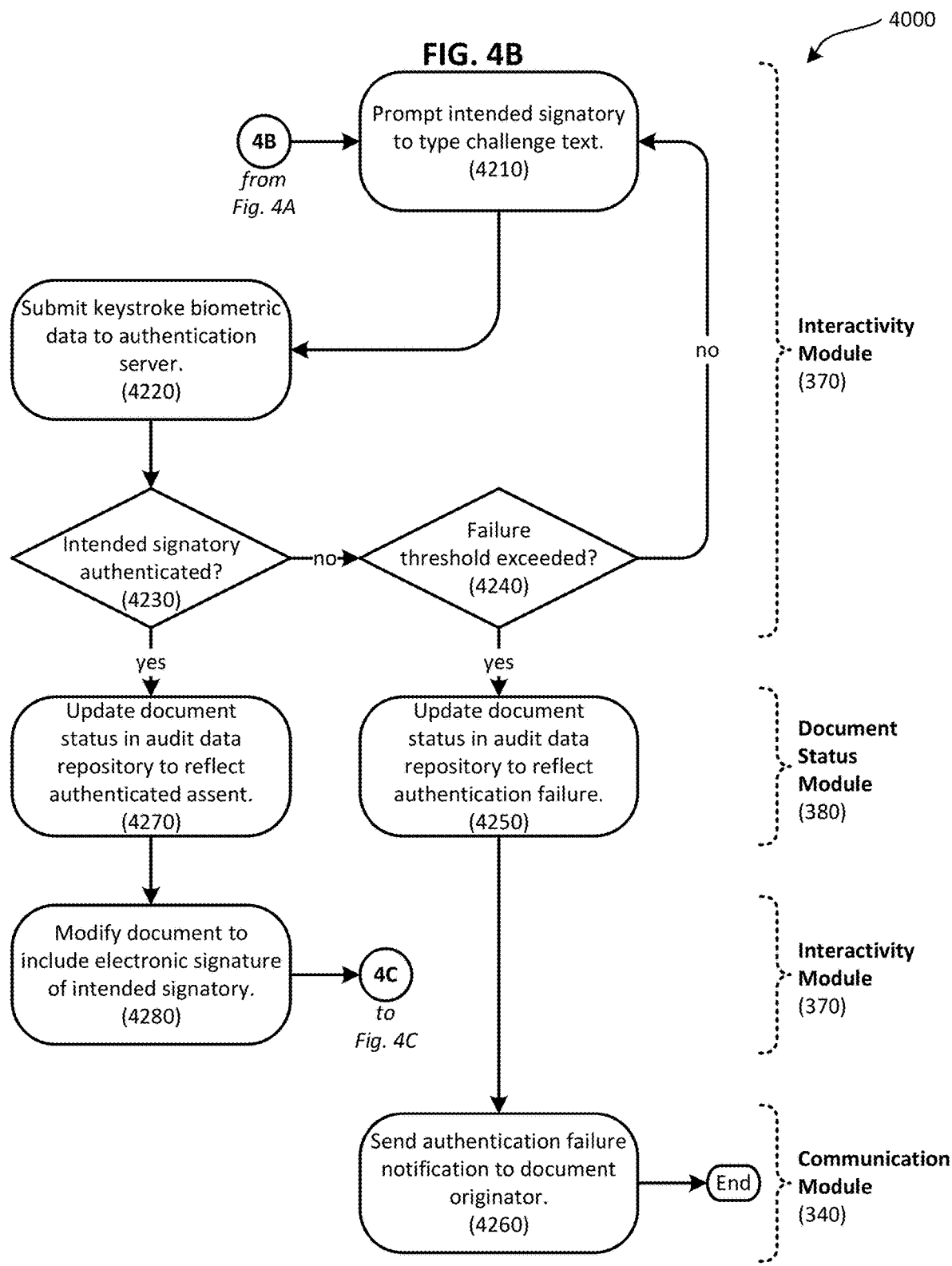

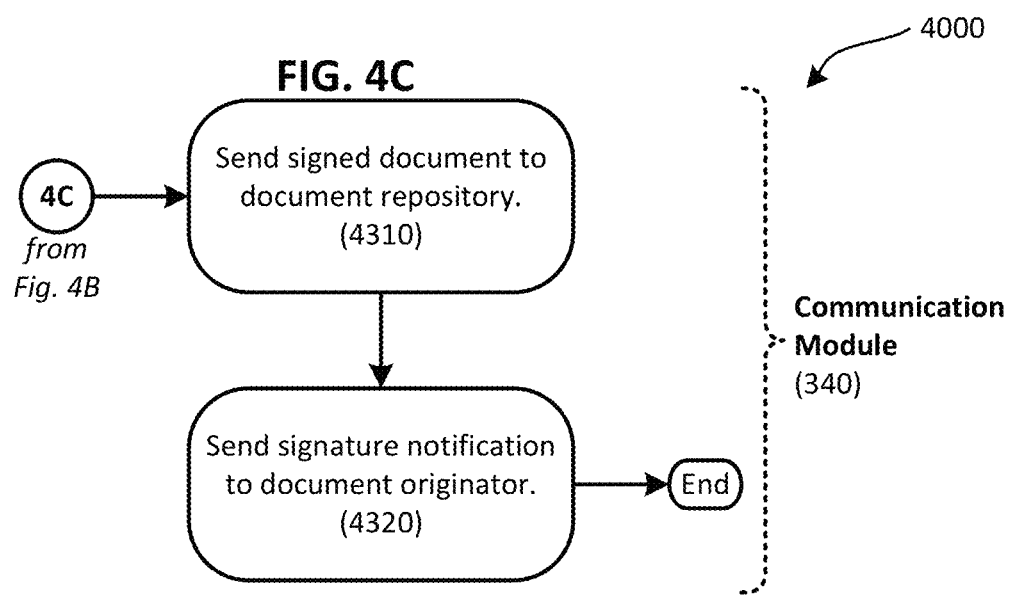

ELECTRONIC SIGNATURE FRAMEWORK WITH KEYSTROKE BIOMETRIC AUTHENTICATION

FIELD OF THE DISCLOSURE

This disclosure relates generally to security enhancements for document processing workflows, and more specifically to an electronic signature framework that provides user authentication that is at least partially based on keystroke biometrics.

BACKGROUND

Computers and electronic documents have become an increasingly indispensable part of modern life. As a result, electronic documents have rapidly gained acceptance as a convenient replacement for conventional paper documents. The growing popularity of electronic documents has resulted in the adaptation of conventional paper-based document processing workflows and security protocols to the electronic realm. One such adaptation has been the increased use and acceptance of electronic signatures on agreements, contracts, and other documents. For example, when negotiating parties agree on a course of action, state of affairs, or other subject matter, the resulting agreement is usually reduced to writing and executed by the parties as a way to memorialize its terms. Since this "reduction to writing" now often takes the form of an electronic document stored on a computer readable medium, electronic signatures have become commonplace and have indeed gained widespread legal recognition. See, for example, the Electronic Signatures in Global and National (ESIGN) Commerce Act, 15 U.S.C. § 96. The wide variety of different formats and legal requirements relating to electronic signatures has resulted in a correspondingly wide variety of workflows and security protocols that facilitate the application of an authenticated electronic signature to a document. In general, electronic signature workflows are influenced by authentication, persistency, and other security concerns which are unique to the electronic realm.

BRIEF DESCRIPTION OF THE DRAWINGS

FIG. 3 is a flowchart illustrating an example technique that a document originator can invoke to configure an electronic signature acquisition workflow that uses keystroke biometrics to authenticate an intended signatory.

FIGS. 4A through 4C comprise a flowchart illustrating an example technique that an intended signatory can invoke to authenticate himself/herself using keystroke biometrics, and to electronically sign a document on the basis of such authentication.

DETAILED DESCRIPTION

While many efficiencies and benefits have been derived from the implementation of workflows based on electronic signatures, such workflows still suffer from certain shortcomings, disadvantages, and other challenges. In particular, electronic signature workflows are subject to security vulnerabilities that are unique to the digital realm, and that therefore call for solutions that are particularly tailored to this context. For example, an unauthorized user may attempt to "forge" an electronic signature by hijacking or otherwise misappropriating an authorized user's authenticated session, thus making it appear that the authorized user has signed a document that he/she actually did not intend to sign. This may occur with varying degrees of sophistication on behalf of the unauthorized attacker. For instance, a sophisticated attacker may launch a remote attack where he/she clandestinely accesses an authorized user's authenticated session and electronically signs a document. A less sophisticated attacker may simply wait for the authorized user to leave his/her workstation unattended after authentication has already occurred, at which point the attacker can sign documents with impunity. In either case, the fact that the authorized user was initially authenticated, for example by providing a valid username and password combination, ultimately does little to prevent the unauthorized user from misappropriating the authenticated session and fraudulently signing documents. The challenges associated with a misappropriated user session are unique to the digital realm: even a thief who steals a paper document will generally find it difficult or impossible to reliably forge an intended signatory's signature. These unique challenges call for solutions that are specifically tailored to, and that are compatible with, existing electronic signature workflows.

Figure 1:
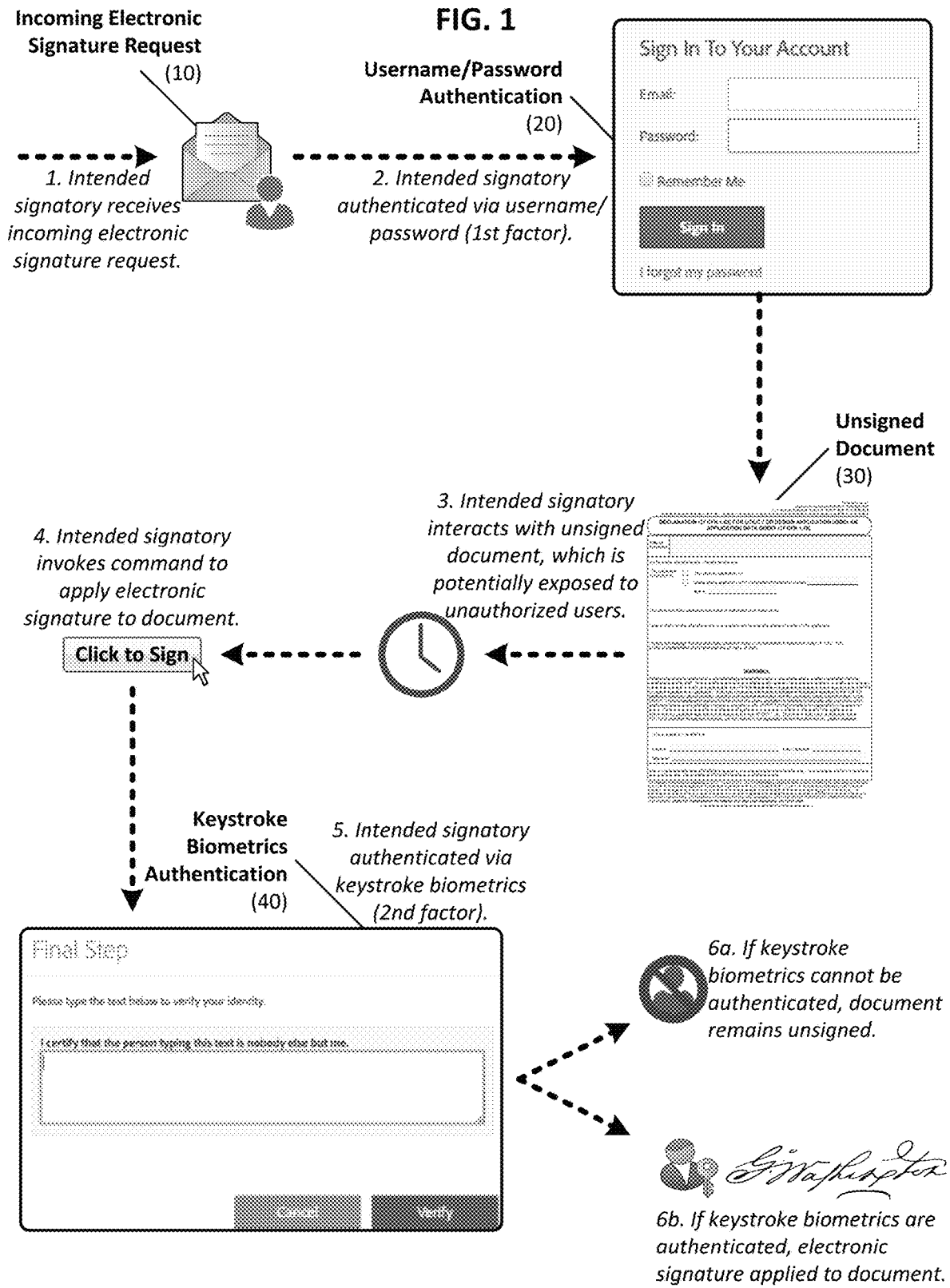
FIG. 1 is a process diagram schematically illustrating an example electronic signature workflow that uses two factor authentication, wherein a username/password combination is used for initial authentication of an intended signatory, and keystroke biometrics are used for subsequent authentication when an electronic signature is actually applied to a document.

Thus, and in accordance with certain of the embodiments disclosed herein, improved document processing workflows provide a more secure electronic signature framework by invoking different authentication requirements at different points in an electronic signature workflow. For example, in one implementation an intended signatory is initially authenticated via a username and password combination when a document is first accessed, and is later re-authenticated using keystroke biometrics, such as when an electronic signature command is actually invoked. FIG. 1 is a process diagram schematically illustrating one example of such an implementation. In this example, an intended signatory receives an incoming electronic signature request 10 that originates from an electronic signature server. Request 10 includes instructions for accessing both an unsigned electronic document 30 as well as server functionality that enables the intended signatory to apply an electronic signature to document 30. To gain such access, the intended signatory must pass username and password authentication 20, which serves as a first authentication factor. After the intended signatory is authenticated, he/she can interact with unsigned document 30 by viewing, editing, or otherwise manipulating it.

However, once the intended signatory is initially authenticated, it can be assumed that his/her work session is subject to being hijacked or otherwise misappropriated by an unauthorized attacker. In view of this possibility, when a command to apply an electronic signature to document 30 is invoked, the would-be signatory must pass keystroke biometrics authentication 40, which serves as a second authentication factor. This second authentication is temporally separated from the first username/password authentication, but it occurs at substantially the same time that the electronic signature is to be applied to document 30. Only if the acquired keystroke biometrics can be authenticated with a requisite confidence level will the electronic signature be applied to document 30. Thus in such implementations applying the electronic signature to document 30 at substantially the same time as successful completion of the second authentication encompasses applying the signature in response to such authentication. Any suitable existing or subsequently developed keystroke biometrics algorithms can be used in this context, as will be described in turn. Numerous alternative configurations and modifications of this example framework will be apparent in light of this disclosure.

Thus, in certain embodiments an improved electronic signature framework provides multi-factor user authentication at different points in an electronic signature workflow. This is an important feature because an electronic signature workflow will often span an extended period of time between the intended signatory's initial request to access a document and his/her subsequent command to actually sign the document. For example, after initially passing username and password authentication, the intended signatory may spend time interacting with and even modifying the document. A form that is to be signed may need to be filled out. The intended signatory may need time to compile information from other sources or confer with colleagues. In any event, the intended signatory's authenticated session is subject to misappropriation during this time. Requiring the signatory to pass a second authentication at the time the document is actually signed—that is, real-time signature authentication—makes it more difficult for an unauthorized user to electronically sign a document, thus providing greater assurance that the user who actually signs the document is authorized to do so. More generally, this specifically tailors the authentication protocol to the unique aspects and particular vulnerabilities associated with an electronic signature framework.

Using keystroke biometrics for the second authentication not only provides the advantages of multifactor authentication in general, but also, in certain embodiments, allows the system to leverage typing that the signatory may naturally provide in the course of filing out and/or signing a document. Authentication based on keystroke biometrics also advantageously avoids any specialized hardware requirements, as would be required in conjunction with other authentication protocols, such as fingerprint, iris, or retina recognition. It minimizes hassle and insecurities associated with forgotten password procedures, and it can be used by both desktop and mobile users. These advantages are equally applicable to workflows used by document originators to prepare and send documents, wherein time often passes between an initial authentication and a subsequent transmission of a finalized version of the document.

As used herein, the terms "document" and "electronic document" both refer, in addition to their respective ordinary meanings, to any collection of information that can be accessed by users of the various systems disclosed herein. A document can be rendered in a variety of different ways, such as via display on a screen, by printing using an output device, or aurally using an audio player and text-to-speech software. Thus it will be appreciated that a document may include digital assets in addition to or instead of text; such digital assets may include, for example, audio clips, video clips, photographs, and other multimedia assets. For instance, an artist may use the framework described herein to apply an electronic signature to a digital image that he or she has created. Documents may encompass a virtually unlimited range of subject matter, including documents that contain terms that are to be agreed to amongst various participants in a given workflow. Examples of documents therefore include agreements, settlements, and legally binding contracts. Documents may be communicated amongst users by a variety of techniques, including by wired or wireless transmission of digital data.

As used herein, the term "electronic signature" refers, in addition to its ordinary meaning, to data that creates a logical association between a particular electronic document and an authenticated user. An electronic signature may comprise, for example, a string of characters, a digital key, a bitmap image such as an image of a handwritten signature, a digitized animation of a handwritten signature, an audio or video recording of a person reciting a spoken phrase such as "I agree to these terms", a video recording of a person performing a sequence of physical gestures, a video recording of a person signing his/her name, or any suitable combination of the foregoing. Electronic signatures may or may not be encrypted or otherwise encoded in a way that limits access or modification by unauthorized third parties. An electronic signature may be personalized and associated with a particular individual, or may be generated automatically in response to a specified user input, such as the selection of an electronic checkbox, the checking of a button in a graphical user interface, or the generation of a touchtone using a telephone keypad. An electronic signature need not be incorporated into a particular electronic document, but may simply be stored as a standalone asset in a resource managed by, for example, an electronic signature server. Where an electronic signature is encoded using binary digits, it may also be referred to as a "digital signature". One example of a product that provides services associated with an electronic signature server is Adobe® Document Cloud (Adobe Systems Incorporated, San Jose, Calif.).

As used herein, the term "document originator" (or "originator") refers, in addition to its ordinary meaning, to a user or entity that represents the source of a document in a workflow. Likewise, the term "document recipient" (or "recipient") refers, in addition to its ordinary meaning, to a user or entity that represents the source of a document in a workflow. Where a document recipient is intended or requested to sign a document, the document recipient may also be referred to as an "intended signatory". Thus, in a generalized electronic signature workflow, a document originator can be understood as sending an unsigned document to an intended signatory with a signature request. A document originator may not necessarily be the creator, author, or generator of a particular document, but rather may simply be a user or entity that initiates a workflow by sending or otherwise providing a document to an electronic signature server or other recipient. Likewise, the document recipient may not be the ultimate recipient of a document, particularly where a document is routed amongst multiple users in a given workflow. Thus, a single user or entity may act as both a document originator and a document recipient in different contexts. Moreover, a given workflow may involve multiple intended signatories which can be required to sign the document according to a specified sequence (a sequential signature workflow), or in any sequence (a parallel signature workflow). It should also be appreciated that the terms document originator, document recipient, and intended signatory are not limited to people or users, but may also refer to entities, organizations, workstations, or computing devices which interact with documents in the course of a workflow. For example, in certain implementations the term document originator refers to a computer system programmed or otherwise configured to generate a document based on specified terms or other parameters. Likewise, the term document recipient may refer to a computer system programmed or otherwise configured to act as a document recipient and signatory on behalf of a particular person or entity. A given workflow may not necessarily involve the document itself being transmitted from a document originator to an intended signatory; in some cases other data related to a document, such as metadata and/or a network address, may be transmitted instead.

As used herein, the term "keystroke biometrics" refers, in addition to its ordinary meaning, to the concept of identifying a user based on observed typing patterns that characterize how a particular user types on a keyboard. These typing patterns include the time a particular key is pressed ("dwell time") and the time between release of one key and activation of the next key ("flight time"). This timing data can be processed through a neural algorithm to determine a keystroke biometric pattern that can be used for subsequent comparisons. The data that is used to generate such a pattern can be obtained by keystroke logging. Some typing characteristics have been observed to be as unique as an individual's handwriting or signature. The techniques used in conjunction with keystroke biometrics vary widely in power and sophistication, and range from statistical techniques to artificial intelligence approaches that employ neural networks. For the purposes of this disclosure, the term "keystroke biometrics" refers to these techniques generally, including to subsequently discovered algorithms and improvements to the ways that an individual can be identified based how he/she types. One example of a keystroke biometrics service provider is TypingDNA (Oradea, Romania). Keystroke biometrics may also be referred to as keystroke dynamics, typing dynamics, and typing biometrics.

System Architecture

Figure 2:
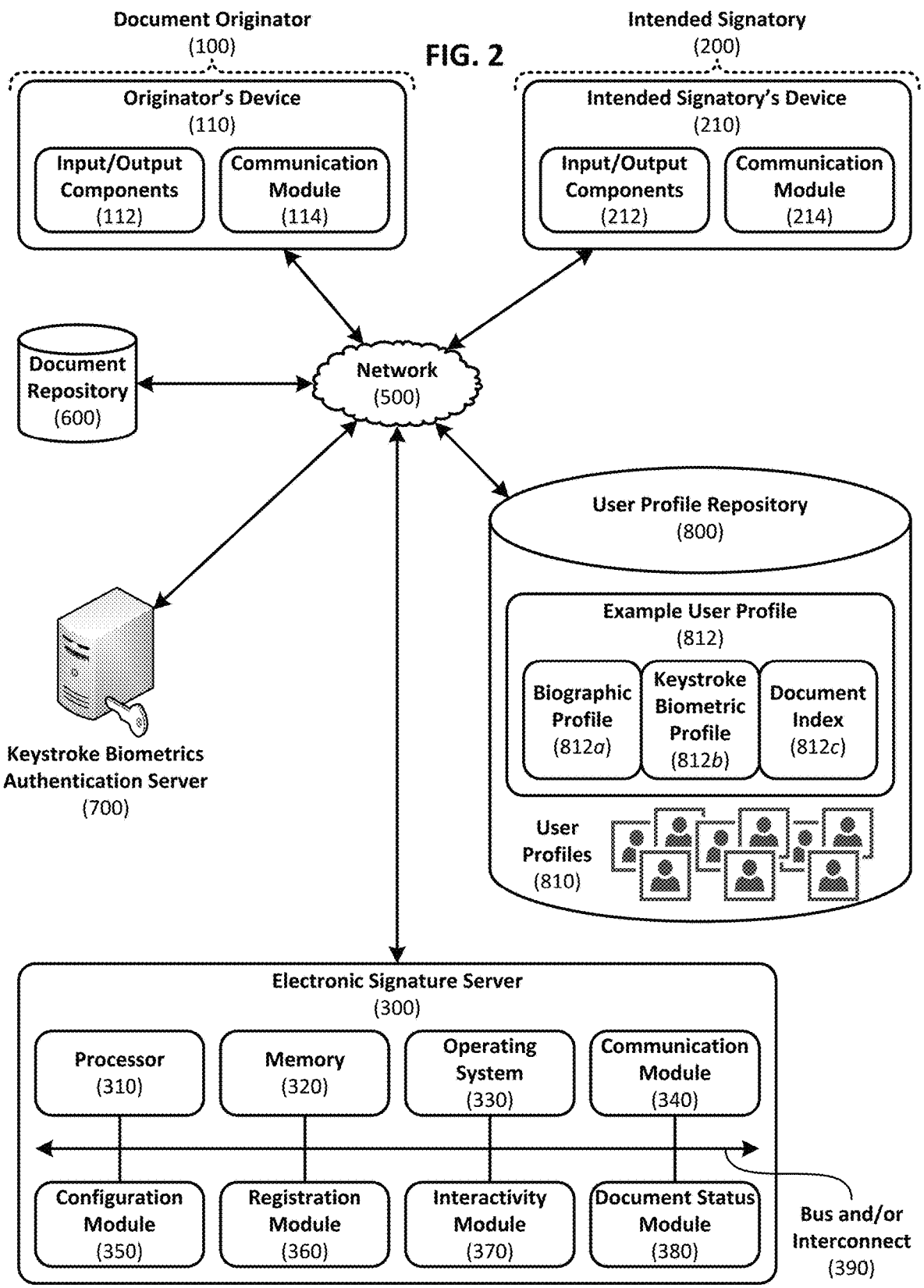
FIG. 2 is a block diagram illustrating selected components of an example electronic signature framework that provides user authentication that is at least partially based on keystroke biometrics.

FIG. 2 is a block diagram illustrating selected components of an example electronic signature framework that provides user authentication that is at least partially based on keystroke biometrics. This framework can be understood as enabling a document originator 100 and an intended signatory 200 to interact with each other in a document processing workflow that is managed by an electronic signature server 300. In such embodiments document originator 100, intended signatory 200, and electronic signature server 300 can communicate with each other via a network 500. Network 500 can also be used to access optional supplementary resources such as a cloud-based document repository 600, a keystroke biometrics authentication server 700, and a user profile repository 800, although additional or alternative resources may be provided in other embodiments. In some cases one or more of such supplementary resources are omitted, and the corresponding functionality is instead provided by document originator 100, intended signatory 200, electronic signature server 300, or some combination thereof. Thus other embodiments may have fewer or more networked resources depending on the granularity of implementation. The various embodiments disclosed herein therefore are not limited to provision or exclusion of any particular resources.

Document originator 100 and intended signatory 200 each have access to a device 110, 210 that facilitates interaction with other users and components of the various systems described herein. For example, each of devices 110, 210 may comprise one or more of a variety of suitable computing devices, such as handheld computers, cellular telephones, tablet computers, smartphones, laptop computers, desktop computers, and set-top boxes. Other devices or device combinations may be used in other embodiments. The document originator's device 110 may be different than or the same as the intended signatory's device 210. In one implementation, each of devices 110, 210 includes input/output components 112, 212 such as one or more of a keyboard, a touch sensitive display, a pointing device, and/or any other suitable input/output device. Each of devices 110, 210 also optionally includes a wired and/or wireless communication module 114, 214 that enables communication with other components via network 500. In one particular implementation, each of devices 110, 210 comprises a smartphone capable of connecting to other components via a cellular data connection. In general, devices 110, 210 may include additional or alternative components as compared to those illustrated in FIG. 2, including digital storage resources, and it should therefore be appreciated that the various embodiments disclosed herein are not limited to any particular hardware or software configuration.

Based on the foregoing, it should be appreciated that the originator's device 110 provides functionality and resources that enable document originator 100 to generate, modify, and otherwise manipulate an electronic document. These functionality and resources also enable document originator 100 to initiate and manage an electronic signature workflow associated with the aforementioned electronic document. To provide a specific example, in one embodiment device 110 is used to draft a new bill of sale for an automobile that document originator 100 wishes to sell. In general, document originator 100 uses input/output components 112 to generate a document that is to be signed by intended signatory 200. To this end, the intended signatory's device 210 provides functionality and resources that enable the intended signatory 200 to access, manipulate, interact with, and if appropriate, electronically sign the document. For instance, one such interaction may involve using input/output components 212 to check a box indicating assent to terms included in the document. Continuing with the previous example, in such an embodiment device 210 is used to access and electronically sign the bill of sale. The documents that document originator 100 and intended signatory 200 interact with may be stored locally at their respective devices 110, 210, may be stored remotely at cloud-based document repository 600, or may be stored by electronic signature server 300, as will be discussed in turn.

Referring still to the example embodiment illustrated in FIG. 2, electronic signature server 300 can be configured to manage and orchestrate workflows that enable documents provided by document originator 100 to be distributed to intended signatory 200, and that enable intended signatory 200 to interact with, assent to the terms of, and electronically sign such documents. Electronic signature server 300 is also configured to manage authentication of document originator 100 and/or intended signatory 200 at various points throughout a given electronic signature workflow. To this end, electronic signature server 300 includes one or more modules configured to implement certain of the functionalities described herein, and optionally further includes hardware configured to enable such implementation. Examples of enabling hardware include a processor 310, a memory 320, a communication module 340, and a bus and/or interconnect 390. Examples of implementing software include an operating system 330, a configuration module 350, a registration module 360, an interactivity module 370, and a document status module 380. Additional or alternative enabling hardware components and implementing software components can be used in other embodiments.

Processor 310 can be any suitable processor, and may include one or more coprocessors or controllers, such as an audio processor or a graphics processing unit, to assist in control and processing operations associated with electronic signature server 300. Memory 320 can be implemented using any suitable type of digital storage, such as one or more of a disc drive, a redundant array of independent discs, a flash memory device, or a random access memory device. In certain embodiments memory 320 is used to store instructions that, when executed using processor 310, cause operations associated with the various modules disclosed herein to be invoked. In some cases memory 320 hosts a document repository that includes both unsigned documents generated by document originators, as well as signed documents executed by intended signatories. Memory 320 can also be used to host a wide variety of other digital resources used in the electronic signature workflows disclosed herein, including user profile data, keystroke biometrics data, audit data, and document status data. Communication module 340 can be any appropriate network chip or chipset which allows for wired or wireless connection to other components of electronic signature server 300 and to network 500, thereby enabling electronic signature server 300 to communicate with other local and remote computer systems, services, and resources, examples of which are illustrated in FIG. 2. Bus and/or interconnect 390 allows for inter- and intra-device communications using communication module 340.

Operating system 330 may comprise any suitable operating system, such as Android™ (Google Inc., Mountain View, Calif.), Windows® (Microsoft Corp., Redmond, Wash.), or OS X® (Apple Inc., Cupertino, Calif.). As should be appreciated in light of this disclosure, the techniques provided herein can be implemented without regard to the particular operating system provided in conjunction with electronic signature server 300, and therefore may also be implemented using any suitable existing or subsequently developed platform.

Still referring to the example embodiment illustrated in FIG. 2, each of configuration module 350, registration module 360, interactivity module 370, and document status module 380 are implemented using a non-transitory computer readable medium (such as memory 320) and one or more processors (such as processor 310) of a computing apparatus. In such embodiments the non-transitory computer readable medium stores program instructions executable by the one or more processors to cause the electronic signature server 300 to perform certain aspects of the techniques described herein.

For example, in certain embodiments configuration module 350 enables various aspects of a given electronic signature workflow to be defined, such as by identifying and marking signature fields and other data entry fields in an unsigned document. Configuration module 350 is optionally responsive to input from document originator 100 in this regard, such as input designating particular authentication protocols which intended signatory 200 must satisfy at one or more points in the workflow before an electronic signature is applied to the document. For example, in one implementation document originator 100 may specify that a signature on a particular document must be authenticated using a keystroke biometric authentication protocol. In certain embodiments registration module 360 enables a previously unregistered intended signatory 200 to create a keystroke biometric profile that can later be used to authenticate intended signatory 200 when he/she attempts to electronically sign a document. Creating a keystroke biometric profile may involve not only providing a typing sample for analysis, but also providing basic biographic data (for example, name, address, and other identification data).

Interactivity module 370 can be configured to provide an interface to users accessing the workflows and resources that are managed by electronic signature server 300. Such an interface may be provided by way of a graphical user interface rendered on a digital display, although other types of interfaces, such as voice response, touchtone, or textual interfaces can be implemented as well. The user interfaces are provided to one or more document originators 100 and/or one or more intended signatories 200. For example, in one embodiment interactivity module 370 generates a user interface capable of guiding intended signatory 200 through the process of receiving, reviewing, assenting to (or declining to assent to), and/or otherwise interacting with a document. This may be accomplished by displaying instructions to, and receiving input from, intended signatory 200. Such instructions may specify, for example, how to access an unsigned document, how to electronically sign the document, and how to authenticate oneself using keystroke biometrics. Interactivity module 370 may also generate a user interface that guides document originator 100 through the process of initially defining the electronic signature workflow. Additional or alternative workflow aspects may be specified in other embodiments, and thus it will be appreciated that the various embodiments disclosed herein are not limited to any particular functionality provided by interactivity module 370.

Document status module 380 can be configured to manage the status of documents used in a workflow that is orchestrated by electronic signature server 300. To this end, in certain embodiments document status module 380 comprises or has access to an audit data repository or other document status data structure that stores information with respect to documents used in a given workflow. Such information may indicate, for example, whether a particular document has been submitted for signature to a particular intended signatory 200, and/or whether intended signatory 200 has agreed to sign the document, has declined to sign the document, or has invoked another workflow process (such as by forwarding the document to an alternative signatory). Such information may also record the type of authentication protocol (or protocols) used to verify a signature on a given document, as well as successful or failed authentication signature attempts, regardless of whether such authentication was attempted using keystroke biometrics or some other authentication protocol. In certain embodiments services provided by interactivity module 370 enable a user to obtain information from document status module 380, such as by submitting a search query to identify, for example, unsigned documents in a given workflow. The data managed by document status module 380 can be used to generate an audit trail for a particular document in a given electronic signature workflow.

Certain embodiments of the system illustrated in FIG. 2 may include supplementary resources and services, such as keystroke biometrics authentication server 700 and user profile repository 800. Keystroke biometrics authentication server 700 provides keystroke authentication services, for example by comparing data associated with two different typing samples and making a prediction with respect to whether the two typing samples were provided by the same user. Keystroke biometrics authentication server 700 also optionally provides a confidence level in a keystroke authentication, in which case electronic signature server 300 may be configured to accept a given authentication only if a requisite confidence level is satisfied. In one example implementation, the services provided by keystroke biometrics authentication server 700 are available at typingdna.com, and are provided by TypingDNA (Oradea, Romania). Any of a wide variety of existing or subsequently developed keystroke biometrics authentication protocols can be used in this regard. For example, in an alternative embodiment keystroke authentication services are instead provided by a cloud platform that uses artificial intelligence, machine learning, and crowd sourcing capabilities to dynamically improve the accuracy of the underlying keystroke authentication protocol. One example of such a cloud platform is Adobe® Sensei, provided by Adobe Systems Incorporated (San Jose, Calif.). Multiple instances of electronic signature server 300 can leverage resources provided by keystroke biometrics authentication server 700 or its cloud platform equivalent.

A networked user profile repository 800 can be used to store a plurality of user profiles 810 associated with document originators, document recipients, and other users who invoke the services provided by electronic signature server 300. As illustrated in FIG. 2, an example user profile 812 includes a biographic profile 812*a*, a keystroke biometric profile 812*b*, and a document index 812*c* associated with a given user. Biographic profile 812*a* includes personal information associated with the user, such as name, address, and identification numbers. Financial data may be included in biographic profile 812*a* in certain embodiments, although it may be omitted in others for security reasons. Keystroke biometric profile 812*b* includes data that characterizes the user's typing, such as dwell time and flight time data for various keystrokes and keystroke combinations. The specific keystroke biometric data that is recorded in a given implementation may depend on the specific authentication algorithm invoked by keystroke biometrics authentication server 700. For example, in one embodiment keystroke biometric profile 812*b* comprises a unique score that is derived from the observed typing patterns. Document index 812*c* includes data that identifies documents associated with the user, such as signed documents and unsigned documents that are still awaiting signature. In some implementations document index 812*c* is separately hosted by electronic signature server 300, for example, in the aforementioned document status module 380. Other profile data can be stored in other embodiments. The data used to generate user profiles 810 is optionally collected by registration module 360, for example when a new intended signatory attempts to electronically sign a document for the first time. This can be accomplished by requesting that the new intended signatory complete a form that includes a typing sample that is analyzed to generate a new keystroke biometric profile. In some cases user profile repository 800 is omitted, and user profiles 810 are stored locally by electronic signature server 300, for example in memory 320.

The embodiments described herein can be implemented in various forms of hardware, software, firmware, or special purpose processors. For example, in one embodiment a non-transitory computer readable medium has instructions encoded thereon that, when executed by one or more processors, cause aspects of the electronic signature workflows disclosed herein to be implemented. The instructions can be encoded using any suitable programming language, such as C, C++, object-oriented C, Java, JavaScript, Visual Basic .NET, BASIC, Scala, or alternatively, using custom or proprietary instruction sets. Such instructions can be provided in the form of one or more computer software applications, applets, or modules that are tangibly embodied on a memory device, and that can be executed by a computer having any suitable architecture. In one embodiment the systems described herein can be hosted on a given website and implemented, for example, using JavaScript or another suitable browser-based technology.

The functionalities disclosed herein can optionally be incorporated into a variety of different software applications, including word processing applications, email clients, document viewer applications, digital imaging applications, and content management systems. For example, a document viewer application can include a "click to sign" feature that allows a user to access functionality provided by electronic signature server 300 and electronically sign a viewed document directly within the viewer itself. The functionalities disclosed herein can additionally or alternatively leverage services provided by separate software applications, such as a web browser application or a keystroke biometrics analysis application that is executing on keystroke biometrics authentication server 700. The computer software applications disclosed herein may include a number of different modules, sub-modules, or other comprises of distinct functionality, and can provide input to, or receive information from, still other components and services. These modules can be used, for example, to communicate with input/output devices such as a display screen, a touch sensitive surface, a printer, or any other suitable input/output device. Other components and functionalities not reflected in the illustrations will be apparent in light of this disclosure, and it will be appreciated that the present disclosure is not intended to be limited to any particular hardware or software configuration. Thus in other embodiments the components illustrated in FIG. 2 may include additional, fewer, or other subcomponents.

The aforementioned non-transitory computer readable medium may be any suitable medium for storing digital information, such as a hard drive, a server, a flash memory device, a random access memory device, or any suitable combination of the foregoing. In alternative embodiments, the computers and modules disclosed herein can implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used in this regard, and that the present disclosure is not intended to be limited to any particular system architecture.

Methodology: Document Originator

FIG. 3 is a flowchart illustrating an example technique 3000 that document originator 100 can invoke to configure an electronic signature acquisition workflow that uses keystroke biometrics to authenticate intended signatory 200. As can be seen, method 3000 includes a number of phases and sub-processes, the sequence of which may vary from one embodiment to another. However, when considered in the aggregate, these phases and sub-processes form a more secure electronic signature framework that is responsive to user input in accordance with certain of the embodiments disclosed herein. Method 3000 can be implemented, for example, using the system architecture illustrated in FIG. 2 and described herein. However other system architectures can be used in other embodiments, as will be apparent in light of this disclosure. To this end, the correlation of the various functionalities shown in FIG. 3 to the specific components illustrated in FIG. 2 is not intended to imply any structural and/or use limitations. Rather other embodiments may include, for example, varying degrees of integration wherein multiple functionalities are effectively performed by one system or module. For instance, in an alternative embodiment a single module is used to mark signature and data entry fields in a document and define an authentication protocol for intended signatory 200. Thus other embodiments may have fewer or more modules depending on the granularity of implementation. Numerous variations and alternative configurations will be apparent in light of this disclosure.

Method 3000 is initiated by document originator 100, who can be authenticated using any suitable authentication protocol, such as username/password authentication or keystroke biometrics authentication. As illustrated in FIG. 3, method 3000 commences with document originator 100 providing electronic signature server 300 with a document that is to be signed by intended signatory 200 (see reference numeral 3110 in FIG. 3). At this point, the document may be referred to as an unsigned document. In some cases, document originator 100 may provide the unsigned document via upload from local storage at the document originator's device 110. Alternatively, the unsigned document can be retrieved form networked document repository 600. Document originator 100 may provide the unsigned document to electronic signature server 300 on his/her own accord, while in other cases document originator 100 provides the unsigned document in response to a request, such as a request from intended signatory 200. For example, a new customer (intended signatory) may request a license agreement from a software vendor (document originator), in response to which the software vendor provides a copy of the new license agreement (unsigned document) to electronic signature server 300, and configures the rules that govern how the new consumer should be authenticated before his/her electronic signature is accepted on the license agreement.

Document originator 100 may provide electronic signature server 300 with additional information that defines certain aspects of the electronic signature workflow. For example, in many embodiments document originator 100 identifies intended signatory 200 (see reference numeral 3120 in FIG. 3), although in alternative embodiments electronic signature server 300 independently identifies intended signatory 200 based on pre-established rules or other parameters. Document originator 100 may identify intended signatory 200 by providing an electronic mail address, although any other suitable identification technique can be used, including the use of an identification number, a username, a real name, or a phone number. In some cases document originator 100 can select a name from an address book or other directory of registered users of electronic signature server 300. Depending on the particular workflow, document originator 100 may identify multiple intended signatories 200 who should be required to sign the document.

In certain embodiments document originator 100 designates one or more protocols for authenticating an electronic signature or other expression of assent that is provided by a would-be document signatory. For example, document originator 100 may specify that a keystroke biometrics protocol is to be used to authenticate intended signatory 200 (see reference numeral 3140 in FIG. 3). In embodiments where intended signatory 200 is required to pass multifactor authentication at different points in the electronic signature workflow, document originator 100 may optionally specify what type of authentication requirements are applied at particular stages of the workflow. For instance, in one implementation, document originator 100 may specify that intended signatory 200 must first pass username/password authentication when he/she initially accesses the unsigned document, and must later pass a keystroke biometrics authentication when he/she actually invokes a command to apply an electronic signature to the document. In still other implementations the authentication protocols are set by an administrator or are otherwise provisioned by default, thereby eliminating any need for document originator 100 to make such designations. In implementations where a document is to be signed by multiple parties, document originator 200 can optionally establish different authentication protocols for the different signatories.

Document originator 100 can use a workflow configuration process invoked by configuration module 350 to designate one or more signature fields, as well as one or more optional data entry fields in the unsigned document (see reference numeral 3150 in FIG. 3). Such field marking can be performed automatically based on a field detection algorithm, or can be performed manually based on input from document originator 100. For example, in one embodiment metadata tags inserted into the unsigned document by document originator 100 at the time of creation indicate how configuration module 350 should mark the signature and data entry fields. In an alternative embodiment, document originator 100 marks the fields manually after the unsigned document is provided to, and optionally analyzed by, electronic signature server 300.

In many cases it is desired to be able to track the status of an electronic signature workflow as it progresses from the point where it is initiated by document originator 100 to the point where an electronic signature associated with an intended signatory is actually applied to a document. To this end, a workflow status process invoked by document status module 380 can be configured to log designated events and other document status milestones in an audit data repository hosted by electronic signature server 300. For example, in one implementation the document status is updated in response to document originator 100 initiating a new electronic signature workflow (see reference numeral 3160 in FIG. 3), in which case the updated document status would indicate that the document is currently waiting to be signed by intended signatory 200. Maintaining accurate status data advantageously facilitates audit activities, thus enabling an administrator, document originator 100, or other user to compile audit data. This makes it easy, for example, to generate a list of documents waiting to be signed by a particular intended signatory, or inquire as to the status of a particular document.

Communication module 340 can be used to send intended signatory 200 instructions for accessing and signing the unsigned document (see reference numeral 3170 in FIG. 3). The document itself may or may not be transmitted directly to intended signatory 200. For example, the unsigned document may simply be cached in memory 320 of electronic signature server 300, in which case the instructions sent to intended signatory 200 comprise an address indicating a storage location for the unsigned document. This allows intended signatory 200 to access and electronically sign the document without ever actually transferring the document to his/her device 210. However, in an alternative embodiment, the unsigned document is transmitted directly to the intended signatory's device 210, for example using an electronic mail service. In this case the unsigned document need not be retained at electronic signature server 300, thus eliminating a potential vector for attempting to comprise the document content Here, the instructions for accessing the unsigned document may simply be instructions to open an email attachment.

Methodology: Intended Signatory

FIGS. 4A through 4C comprise a flowchart illustrating an example technique 4000 that intended signatory 200 can invoke to authenticate himself/herself using keystroke biometrics, and to electronically sign a document on the basis of such authentication. As can be seen, method 4000 includes a number of phases and sub-processes, the sequence of which may vary from one embodiment to another. However, when considered in the aggregate, these phases and sub-processes form a more secure electronic signature framework that is responsive to user input in accordance with certain of the embodiments disclosed herein. Method 4000 can be implemented, for example, using the system architecture illustrated in FIG. 2 and described herein. However other system architectures can be used in other embodiments, as will be apparent in light of this disclosure. To this end, the correlation of the various functionalities shown FIGS. 4A through 4C to the specific components illustrated in FIG. 2 is not intended to imply any structural and/or use limitations. Rather other embodiments may include, for example, varying degrees of integration wherein multiple functionalities are effectively performed by one system or module. For instance, in an alternative embodiment a single module is used to gather keystroke biometric data from a new intended signatory and guide the new intended signatory through the signature acquisition process. Thus other embodiments may have fewer or more modules depending on the granularity of implementation. Numerous variations and alternative configurations will be apparent in light of this disclosure.

Method 4000 is initiated when intended signatory 200 receives instructions for accessing and signing an unsigned document (see reference numeral 4110 in FIG. 4A). Such instructions may be communicated to intended signatory 200 via electronic mail from electronic signature server 300, for example. In certain implementations the instructions guide intended signatory 200 through an initial authentication process, such as a username/password authentication process, that enables intended signatory 200 to establish a secure session with electronic signature server 300 (see reference numeral 4120 in FIG. 4A). This initial authentication is particularly valuable where it is desired that only authorized parties have access to unsigned document, although it may be required in other implementations as well. As noted above, in certain embodiments this initial authentication process comprises one part of a multifactor authentication framework that also includes authentication based on keystroke biometrics at the time an electronic signature is actually applied to the unsigned document. Thus this initial authentication can be understood as providing intended signatory 200 with access to the unsigned document, but not enabling intended signatory 200 to actually apply his/her signature to the document. In certain implementations this initial authentication can be performed by interactivity module 370. However, it should be appreciated that this initial authentication is optional, particularly in cases where the document is a publicly available document or does not contain sensitive information. In such cases it may be preferable to omit the initial authentication altogether, and instead rely solely on authentication at the time an electronic signature command is received, such as may be provided using the keystroke biometric authentication techniques disclosed herein. Omitting the initial authentication makes it easier for the intended signatory to quickly access an unsigned document that does not contain sensitive information.

If keystroke biometrics are to be used to re-authenticate intended signatory 200 when his/her electronic signature is to be applied to the document, a baseline keystroke biometric profile should exist for intended signatory 200. This is because keystroke biometrics authentication generally involves comparing data in a trusted keystroke biometric profile with data collected from a user who is to be authenticated. Registration module 360 can therefore be configured to make a determination with respect to whether a keystroke biometric profile already exists for intended signatory (see reference numeral 4140 in FIG. 4A). Such a profile may not exist for a new intended signatory who has not previously accessed resources provided by electronic signature server 300, or who has not completed a workflow that called for the creation of such a profile. In any event, if a keystroke biometric profile does not exist for intended signatory 200, registration module 360 can be configured to prompt intended signatory 200 to create such a profile (see reference numeral 4150 in FIG. 4A), for example by typing a specified text string. Any of a variety of suitable techniques for generating a keystroke biometric profile can be used in this regard. Once created, the profile is optionally encrypted and stored in user profile repository 800 (see reference numeral 4160 in FIG. 4A).

Regardless of whether a new keystroke biometric profile is created, once intended signatory 200 has been authenticated he/she can access and interact with the unsigned document (see reference numeral 4170 in FIG. 4A). In general, this period of access may be prolonged, and may therefore be subject to hijacking or misappropriation by unauthorized third parties. At some point a command to apply an electronic signature to the unsigned document may be invoked (see reference numeral 4180 in FIG. 4A). Unfortunately, because time has passed, there may be a low degree of confidence that the previously authenticated intended signatory 200 is actually the party who invokes this electronic signature command.

To address this potential security vulnerability, interactivity module 370 can invoke a second part of a multifactor authentication framework. More specifically, in certain embodiments interactivity module 370 is configured to prompt intended signatory 200 to type a challenge text (see reference numeral 4210 in FIG. 4B). The challenge text may be identical to the text used to create the user's keystroke biometric profile in the first place, although this is not required. Keystroke biometrics are collected as the user types, and the collected data is submitted to keystroke biometrics authentication server 700 (see reference numeral 4220 in FIG. 4B). In some cases the intended signatory's interactions with the document itself are analyzed to generate keystroke biometrics. This may be particularly useful where intended signatory 200 is required to fill out form fields by typing textual data in a narrative format. Significantly, this second authentication will often be temporally separated from the initial authentication due to the fact that intended signatory 200 will typically spend time interacting with the document before deciding to sign it. In various embodiments the first and second authentications may be separated by at least one minute, at least two minutes, at least three minutes, at least five minutes, at least eight minutes, at least ten minutes, at least fifteen minutes, or at least twenty minutes. In alternative embodiments the second authentication is required in response to determining that a predetermined time period (such as one of the aforementioned time periods) has elapsed since the first authentication.

Regardless of the particular technique used to generate the keystroke biometrics data, keystroke biometrics authentication server 700 compares keystroke biometric data acquired based on how the challenge text was typed with a keystroke biometric profile corresponding to intended signatory 200. The results of this comparison are reported to interactivity module 370, which makes a determination with respect to whether the user who invoked the electronic signature command can be authenticated as intended signatory 200 (see reference numeral 4230 in FIG. 4B). If an authentication failure occurs, the user is prompted to enter the challenge text again, provided that a failure threshold has not been exceeded (see reference numeral 4240 in FIG. 4B). However, if a threshold number of authentication attempts fail, the workflow status process invoked by document status module 380 can be configured to record such failure in the audit data repository (see reference numeral 4250 in FIG. 4B). Communication module 340 can be configured to send an authentication failure notification to document originator (see reference numeral 4260 in FIG. 4B), thus alerting him/her to the fact that an unauthorized third party may have attempted to sign the document, and as a result, that the document remains unsigned.

On the other hand, if the user who invoked the electronic signature command can be authenticated as intended signatory 200 based on the keystroke biometric data derived from observing how the challenge text was typed, the workflow status process invoked by document status module 380 can be configured to record such authentication in the audit data repository (see reference numeral 4270 in FIG. 4B). Interactivity module 370 can then modify the document to include the electronic signature of intended signatory 200 (see reference numeral 4280 in FIG. 4B). Communication module 340 optionally sends the signed document to networked document repository 600 (see reference numeral 4310 in FIG. 4C) and sends a signature notification to document originator 100 (see reference numeral 4320 in FIG. 4C). This alerts document originator 100 to the fact that the document has been electronically signed by intended signatory 200. It also provides intended signatory 200 with the impression that his/her signature is applied to the document in response to, or at substantially the same time as, the successful completion of the second authentication.

Requiring intended signatory 200 to pass a multifactor authentication protocol wherein different authentication requirements are imposed at different stages of the electronic signature workflow provides a greater degree of confidence that a secure work session has not been hijacked or otherwise misappropriated by an unauthorized third party. While certain of the disclosed embodiments are described in the context of requiring a second authentication at the time a document is electronically signed, other embodiments may be implemented so as to require a second authentication, such as a keystroke biometrics authentication, at other stages of an electronic signature workflow. For example, in an alternative implementation authentication based on keystroke biometrics is required upon delegation of signature authority from intended signatory 200 to a delegate. In still other embodiments a second authentication factor based on keystroke biometrics can be implemented when a user, such as document originator 100, wishes to save an authored document or secure a digital assent. In general requiring two different authentication factors at two different stages of a workflow that are temporally separated reduces the risk that a secure work session is hijacked or otherwise misappropriated by an unauthorized third party.

Further Example Embodiments

Numerous variations and configurations will be apparent in light of this disclosure. For instance, one example embodiment provides a computer-implemented document processing method that comprises electronically receiving, from a first computing device associated with a document originator in an electronic signature workflow, metadata that identifies a document that is to be distributed to a second computing device associated with an intended signatory in the workflow. The method further comprises electronically transmitting, to the second computing device, instructions for accessing the document. The method further comprises authenticating the intended signatory using a first authentication protocol. The method further comprises providing the second computing device with access to the document. The method further comprises receiving, from the second computing device, a command to apply an electronic signature to the document. The method further comprises, in response to receiving the command, authenticating the intended signatory using a second authentication protocol. The method further comprises, in response to authenticating the intended signatory using the second authentication protocol, applying the electronic signature to the document. In some cases the method further comprises receiving, from the first computing device, authentication requirements that define at least one of the first and second authentication protocols. In some cases the instructions for accessing the document are transmitted to the second computing device in response to a request that is received from the second computing device. In some cases the method further comprises (a) receiving data input from the second computing device after the intended signatory has been authenticated using the first authentication protocol, wherein the data input comprises form data that is to be added to the document; (b) generating keystroke biometrics data based on the data input; and (c) using the keystroke biometrics data to authenticate the intended signatory with the second authentication protocol. In some cases the second computing device is provided with access to the document in response to authenticating the intended signatory using the first authentication protocol. In some cases the method further comprises (a) making a determination that a keystroke biometrics profile is unavailable for the intended signatory; (b) prompting the intended signatory to provide a typing sample in response to being authenticated using the first authentication protocol; and (c) generating the keystroke biometrics profile based on the typing sample. In some cases at least five minutes elapse between authenticating the intended signatory using the first and second authentication protocols. In some cases authenticating the intended signatory using the second authentication protocol comprises (a) prompting the intended signatory to provide a typing sample; (b) generating keystroke biometrics characterizing how the typing sample was typed; and (c) comparing the generated keystroke biometrics with a baseline keystroke biometrics profile. In some cases (a) the first authentication protocol is a username/password authentication; and (b) the second authentication protocol is based on keystroke biometrics.

Another example embodiment provides an electronic signature system that comprises a memory and a processor that is coupled to, and capable of executing instructions stored in, the memory. The system further comprises a registration module that is stored in the memory. The registration module comprises means for creating a keystroke biometric profile for an intended signatory. The system further comprises an interactivity module that is stored in the memory. The interactivity module comprises means for performing an initial authentication of the intended signatory in response to receiving an initial request from the intended signatory to access an unsigned document. The interactivity module further comprises means for performing a subsequent authentication of the intended signatory in response to receiving a subsequent request from the intended signatory to apply an electronic signature to the unsigned document. The interactivity module further comprises means for applying the electronic signature to the unsigned document, thereby creating an electronically signed document, in response to successful completion of the subsequent authentication. In some cases the system further comprises a document status module comprising means for updating a status of the electronically signed document in an audit data repository. In some cases the system further comprises a configuration module comprising means for marking a signature field in the unsigned document. In some cases the keystroke biometric profile is created for the intended signatory in response to making a determination that no keystroke biometric profile is available for the intended signatory. In some cases (a) the initial authentication is based on a username/password combination; and (b) the subsequent authentication is based on keystroke biometrics.

Another example embodiment provides a non-transitory computer readable medium encoded with instructions that, when executed by one or more processors, cause a document workflow process to be carried out. The process comprises receiving, from a document originator, metadata that identifies a document that is to be distributed to an intended signatory as part of a workflow. The process further comprises transmitting, to the intended signatory, instructions for accessing the document;. The process further comprises authenticating the intended signatory using a first authentication protocol. The process further comprises providing the intended signatory with access to the document. The process further comprises receiving, from the intended signatory, a command to apply an electronic signature to the document. The process further comprises, in response to receiving the command, authenticating the intended signatory using a second authentication protocol. The process further comprises, in response to authenticating the intended signatory using the second authentication protocol, applying the electronic signature to the document. In some cases the process further comprises receiving, from the document originator, instructions to use keystroke biometrics for the second authentication protocol. In some cases authenticating the intended signatory using the second authentication protocol comprises (a) prompting the intended signatory to provide a typing sample; (b) sending, to a keystroke biometrics authentication server, keystroke biometrics that characterize how the typing sample was typed; and (c) receiving, from the keystroke biometrics authentication server, an indication of whether the keystroke biometrics correspond to an existing keystroke biometrics profile. In some cases the first and second authentication protocols are different. In some cases the intended signatory is authenticated using the first authentication protocol in response to receiving a request to access the document from the intended signatory. In some cases (a) the first authentication protocol is a username/password authentication; and (b) the second authentication protocol is based on keystroke biometrics.

Another example embodiment provides a non-transitory computer readable medium encoded with instructions that, when executed by one or more processors, cause an electronic signature process to be invoked. The process comprises receiving, from a first computing device associated with a document originator in an electronic signature workflow, metadata that identifies a document that is to be distributed to a second computing device associated with an intended signatory in the workflow. The process further comprises transmitting, to the second computing device, instructions for accessing the document. The process further comprises making a first determination that no keystroke biometric profile is available for the intended signatory. The process further comprises, in response to making the first determination, prompting the intended signatory to provide a first typing sample. The process further comprises generating a keystroke biometric profile for the intended signatory based on how the first typing sample was typed. The process further comprises providing the second computing device with access to the document. The process further comprises receiving, from the second computing device, a command to apply an electronic signature to the document. The process further comprises, in response to receiving the command, prompting the intended signatory to provide a second typing sample. The process further comprises generating keystroke biometrics characterizing how the second typing sample was typed. The process further comprises making a second determination that the second typing sample was typed by the intended signatory based on a comparison of the keystroke biometrics with the keystroke biometric profile. The process further comprises, in response to making the second determination, applying the electronic signature to the document. In some cases the electronic signature process further comprises receiving, from the first computing device, instructions to use keystroke biometrics to authenticate the intended signatory. In some cases making the second determination further comprises (a) sending, to a keystroke biometrics authentication server, the keystroke biometrics that characterize how the second typing sample was typed; and (b) receiving, from the keystroke biometrics authentication server, a degree of confidence with respect to whether the keystroke biometrics correspond to the keystroke biometrics profile for the intended signatory. In some cases the electronic signature process further comprises requiring the intended signatory to satisfy a username/password authentication protocol before the intended signatory is prompted to provide the first typing sample. In some cases the electronic signature process further comprises storing the generated keystroke biometric profile in a user profile repository. In some cases the electronic signature process further comprises updating a status of the document in an audit data repository.

The foregoing disclosure has been presented for the purposes of illustration and description. It is not intended to be exhaustive or to be limited to the particular described embodiments. Many modifications and variations are possible. It is therefore intended that the scope of the invention be limited not by this detailed description, but rather by the claims appended hereto.

This disclosure is related to U.S. patent application Ser. No. 14/069,674 (filed 1 Nov. 2013), the entire disclosure of which is hereby incorporated by reference herein. This disclosure is related to U.S. Pat. No. 9,544,149 (issued 10 Jan. 2017), the entire disclosure of which is hereby incorporated by reference herein. This disclosure is related to U.S. patent application Ser. No. 14/534,583 (filed 6 Nov. 2014), the entire disclosure of which is hereby incorporated by reference herein. This disclosure is related to U.S. Pat. No. 9,531,545 (issued 27 Dec. 2016), the entire disclosure of which is hereby incorporated by reference herein. This disclosure is related to U.S. Pat. No. 9,432,368 (issued 30 Aug. 2016), the entire disclosure of which is hereby incorporated by reference herein. This disclosure is related to U.S. patent application Ser. No. 14/840,380 (filed 31 Aug. 2015), the entire disclosure of which is hereby incorporated by reference herein. This disclosure is related to U.S. patent application Ser. No. 14/859,944 (filed 21 Sep. 2015), the entire disclosure of which is hereby incorporated by reference herein. This disclosure is related to U.S. patent application Ser. No. 15/166,979 (filed 27 May 2016), the entire disclosure of which is hereby incorporated by reference herein.

What is claimed is:

1. A computer-implemented document processing method that comprises:
   electronically receiving, from a first computing device associated with a document originator in an electronic signature workflow, metadata that identifies a document;
   electronically transmitting, to a second computing device associated with an intended signatory in the workflow, instructions for accessing the document;
   authenticating the intended signatory using a first authentication protocol;
   in response to authenticating the intended signatory, providing the second computing device with access to the document;
   after the second computing device has been provided access to the document, receiving data input into the document by the intended signatory;
   generating keystroke biometrics data based on the data input into the document;
   receiving, from the second computing device, a command to apply an electronic signature to the document;
   in response to receiving the command, authenticating the intended signatory using the keystroke biometrics data; and
   in response to authenticating the intended signatory using the keystroke biometrics data, applying the electronic signature to the document.

2. The method of claim 1, further comprising receiving, from the first computing device, authentication requirements that define the first authentication protocol.

3. The method of claim 1, wherein the instructions for accessing the document are transmitted to the second computing device in response to a request that is received from the second computing device.

4. The method of claim 1, wherein the document comprises a fillable form, and wherein the data input into the document comprises form data added to the fillable form.

5. The method of claim 1, further comprising, after applying the electronic signature to the document, updating a status of the document in an audit data repository.

6. The method of claim 1, further comprising:
   making a determination that a keystroke biometrics profile is unavailable for the intended signatory;
   prompting the intended signatory to provide a typing sample in response to being authenticated using the first authentication protocol; and
   generating the keystroke biometrics profile based on the typing sample.

7. The method of claim 1, wherein at least five minutes elapse between authenticating the intended signatory using the first authentication protocol and authenticating the intended signatory using the keystroke biometrics data.

8. The method of claim 1, wherein authenticating the intended signatory using the keystroke biometrics data comprises comparing the keystroke biometrics data with a baseline keystroke biometrics profile for the intended signatory.

9. The method of claim 1, wherein the first authentication protocol is a username/password authentication.

10. An electronic signature system comprising:
    a memory;
    a processor that is coupled to, and capable of executing instructions stored in, the memory;
    a registration module that is stored in the memory, the registration module comprising means for creating a keystroke biometric profile for an intended signatory; and
    an interactivity module that is stored in the memory, the interactivity module comprising
       means for performing an initial authentication of the intended signatory and for providing the intended signatory access to an unsigned document in response to performing the initial authentication,
       means for receiving, from the intended signatory, data input associated with data entry into the unsigned document,
       means for generating keystroke biometrics data based on the data input,
       means for performing a subsequent authentication of the intended signatory using the keystroke biometrics data in response to receiving a request from the intended signatory to apply an electronic signature to the unsigned document, and
       means for applying the electronic signature to the unsigned document, thereby creating an electronically signed document, in response to successful completion of the subsequent authentication.

11. The electronic signature server of claim 10, further comprising a document status module comprising means for updating a status of the electronically signed document in an audit data repository.

12. The electronic signature server of claim 10, further comprising a configuration module comprising means for marking a signature field in the unsigned document.

13. The electronic signature server of claim 10, wherein the keystroke biometric profile is created for the intended signatory in response to making a determination that no keystroke biometric profile is available for the intended signatory.

14. The electronic signature server of claim 10, wherein the initial authentication is based on a username/password combination.

15. A non-transitory computer readable medium encoded with instructions that, when executed by one or more processors, causes an electronic signature process to be invoked, the electronic signature process comprising:
    receiving, from a first computing device associated with a document originator in an electronic signature workflow, metadata that identifies a document;
    transmitting, to a second computing device associated with an intended signatory in a workflow, instructions for accessing the document;
    providing the second computing device with access to the document;
    after the second computing device has been provided access to the document, receiving data input that is later added to the document;
    generating keystroke biometrics data based on the data input;
    receiving, from the second computing device, a command to apply an electronic signature to the document;
    in response to receiving the command, making a determination that the data input from the second computing device was typed by the intended signatory based on a comparison of the keystroke biometrics data with a keystroke biometric profile of the intended signatory; and in response to making the determination, applying the electronic signature to the document.

16. The non-transitory computer readable medium of claim 15, wherein the electronic signature process further comprises receiving, from the first computing device, instructions to use keystroke biometrics to authenticate the intended signatory.

17. The non-transitory computer readable medium of claim 15, wherein making the determination further comprises:

sending, to a keystroke biometrics authentication server, the keystroke biometrics data; and receiving, from the keystroke biometrics authentication server, a degree of confidence with respect to whether the keystroke biometrics data correspond to the keystroke biometrics profile for the intended signatory.

18. The non-transitory computer readable medium of claim 15, wherein the electronic signature process further comprises requiring the intended signatory to satisfy a username/password authentication protocol before the second computing device is provided with access to the document.

19. The non-transitory computer readable medium of claim 15, wherein the keystroke biometric profile is stored in a user profile repository.

20. The non-transitory computer readable medium of claim 15, wherein the electronic signature process further comprises updating a status of the document in an audit data repository.

* * * * *